United States Patent [19]

Arao et al.

[11] 4,183,293
[45] Jan. 15, 1980

[54] JUICE EXTRACTOR

[75] Inventors: Yuzuru Arao, Takatsuki; Katsufumi Nishio, Toyonaka; Masashi Mikami, Osaka; Toyoaki Murasawa, Nishinomiya, all of Japan

[73] Assignee: Matsushita Electric Industrial Co., Ltd., Kadoma, Japan

[21] Appl. No.: 853,831

[22] Filed: Nov. 21, 1977

[30] Foreign Application Priority Data

Dec. 22, 1976 [JP] Japan .................. 51-155359

[51] Int. Cl.² .............................................. A23N 1/02
[52] U.S. Cl. ..................................... 99/512; 99/513
[58] Field of Search ............... 99/456, 458, 460, 465, 99/495, 503, 509–513; 100/116, 125, 156; 210/369, 280 R; 233/1 E

[56] References Cited

U.S. PATENT DOCUMENTS

| 2,343,327 | 3/1944 | Reynolds | 99/511 |
| 2,660,211 | 11/1953 | Berglind | 99/512 |

FOREIGN PATENT DOCUMENTS

| 1152788 | 8/1963 | Fed. Rep. of Germany | 99/512 |
| 936329 | of 1963 | United Kingdom | 99/512 |
| 277990 | of 1970 | U.S.S.R. | 99/513 |

*Primary Examiner*—Harvey C. Hornsby
*Assistant Examiner*—Timothy F. Simone
*Attorney, Agent, or Firm*—Cushman, Darby & Cushman

[57] ABSTRACT

A juice extractor capable of adjusting contents of fine sized pulp in the juice comprising
a centrifugal basket having a filter of an inverted frustum of cone with an open larger top and a smaller bottom connected to an underlying pot part, the pot part having cutting teeth on its substantially flat inner bottom face and connected to the base part of said filter,
a food feeding duct situated substantially vertical to and over the bottom face of the basket and
a motor to rotate said basket at a high speed,
wherein the peripheral wall of the pot part has a specified height and has a specified number of small perforations and
an adjustable scraper is provided to scrape on the perforated part of the peripheral wall when set to select a making of pulp containing juice.

11 Claims, 6 Drawing Figures

JUICE EXTRACTOR

BACKGROUND OF THE INVENTION

This invention relates to an improvement in fruit and vegetable juice extractors of the type wherein the fruit and vegetables or the like are grated or ground and centrifugalized for separation of the juice from the pulp or solid part.

One of such juice extractor is described in the specification of the U.S. Pat. No. 2,343,327, which discloses:

A fruit and vegetable juice extractor comprising, a rotary food basket mounted on a substantially vertical axis of rotation and having an annular concentric perforated side wall and a bottom wall and adapted to receive ground food such as fruits and vegetables and the like adjacent the bottom thereof, means to deliver food to be ground to said bottom wall, means for rotating said basket about its axis at a high velocity of several thousand revolutions per minute to effect a centrifugal movement of the ground food outwardly against the lower part of said wall, the lower part of said wall being formed with a shoulder to receive and break up the ground food centrifugally thrown thereagainst, the remainder of said wall sloping upwardly and outwardly from said shoulder to facilitate the upward travel of the ground food thereover in a relatively thin layer, and juice collector means surrounding said wall and adapted to receive the juice centrifugally expelled through said wall.

In such conventional juice extractor, the food, grated by the cutting teeth on the inner bottom face of the inverted frustro-conical rotatable basket, slides on the inner bottom face by the centrifugal force radially to the low vertical shoulder part of the filter net and then upwardly on the frustro-conical filter part. Since the height of the vertical shoulder part is very low, the ground mixture of the juice and the pulp are driven smoothly and quickly towards the frustro-conical filter part. Therefore, the mixture of the juice and pulp travels too fast toward the peripheral part of the basket, and hence a considerable amount of the juice flows together with pulp away from the upper periphery of the basket, not being effectively extracted of the juice. Furthermore, since the pulp of the food travels fast toward the upper peripheral end part of the basket, the pulp is prematurely discharged from the basket into a pulp sump space, thereby wasting a nourishing part of the food, unutilized. In such conventional juice extractor, only a relatively small percentage of the food, for example, 70% of apple, has been utilized, and 20 to 40% of the nourishment of the food has been wasted.

SUMMARY OF THE INVENTION

The present invention aims to provide a juice extractor with a frustro-conical centrifugal basket capable extracting a higher rate of nourishment of food by making a very fine pulpy component of the food and mixing it in the juice thereby to provide a more nourishing juice.

BRIEF EXPLANATION OF THE INVENTION

DETAILED DESCRIPTION OF THE INVENTION

The present invention is characterized by comprising an adjustable scraper which is provided to contact a substantially vertical peripheral wall formed at the bottom part, a peripheral wall having a specified number of perforations on which said scraper scrapes.

Referring to the accompanying drawing, a preferred example embodying the present invention is elucidated in detail hereafter.

Figure 1:
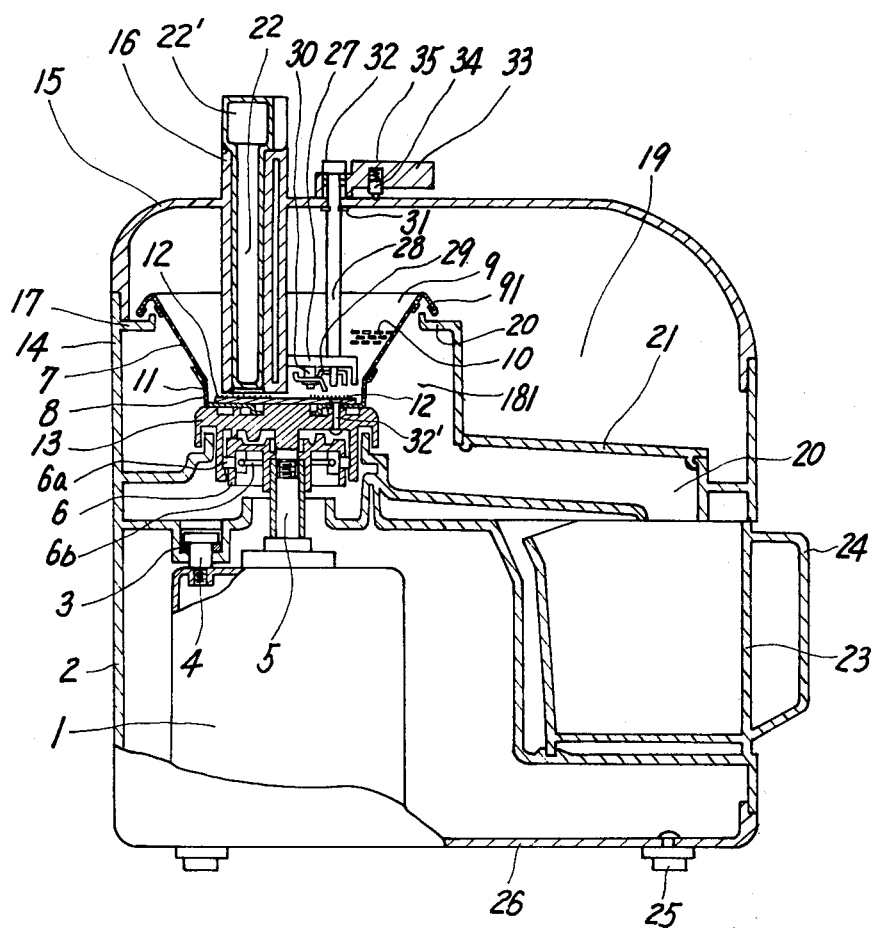
FIG. 1 is a sectional elevation view of the juice extractor embodying the present invention.

FIG. 1 shows the general construction of the juice extractor of the preferred example, wherein in a body case 2, an electric motor 1 is held, by means of a specified number of bolts 4 and rubber cushions 3, with its shaft 5 vertically upwards. The body case 2 has a bottom plate 26 and stand points 25, 25 secured thereto. To the top of the shaft 5, a rotatable table 6 with known clutch pins 6a, 6a and springs 6b, 6b is secured. A base 13 of a rotatable basket 9 is detachably and coaxially received on the rotatable table 6, and is clamped by the clutch pins 6a and 6a in order to attain stable clamping suitable for high speed rotation of the basket 9 on the rotatable table 6.

Figure 3:
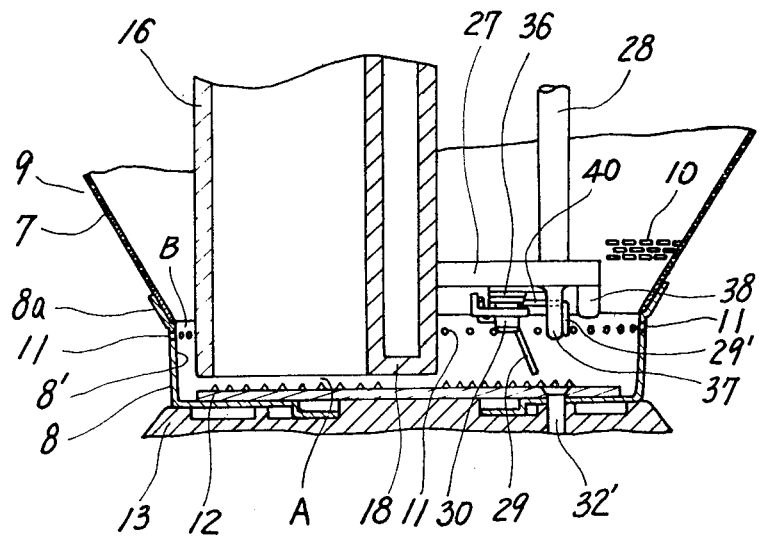
FIG. 3 is an enlarged partial sectional elevation view, at the sectional plane III—III shown in FIG. 2, of a basket, the adjustable scraper and relative members.
Figure 4:
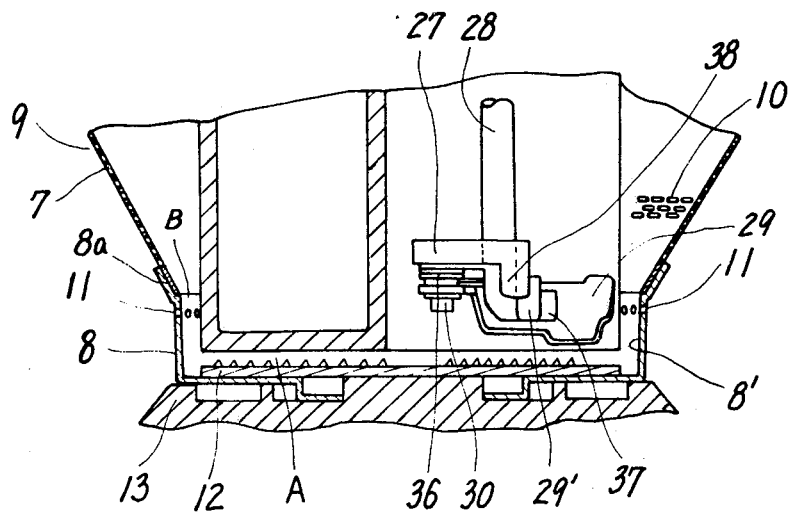
FIG. 4 is an enlarged partial sectional side view, at the sectional plane IV—IV shown in FIG. 2, of the basket, the adjustable scraper and relative members.

The rotatable basket 6 comprises an inverted cone-frustum shaped filter 7 with a large number of small perforations 10. A pot part 8 is connected at the bottom of the filter 7, and a ring shaped reinforcing flange 91 is connected at the top part of the filter 7. On the inner face of the bottom plate of the pot part 8 is secured a cutter plate 12 having a number of raised cutting teeth thereon. Details of the rotatable basket 9 and relative parts are shown in FIG. 3 and FIG. 4, wherein the connecting parts of the filter 7 to the pot part 8 are shaped to have offset parts 8a in order that the inner face of the basket 9 is substantially smooth or flush at the connecting lines. The pot part 8 has a substantially flat inner bottom face and a substantially vertical but slightly upward-diverging peripheral wall 8' and a specified number of perforations 11, 11 are formed thereon. The size of the perforations 11, 11 is selected larger than those of the filter 7. The cutting teeth on the substantially flat cutter plate 12 are disposed in a plan view in a manner that radial rows of the teeth lag the more behind radial lines with respect to the direction of the rotation as a tooth is the more distant from the shaft of the rotation, so that ground food is easily driven radially toward the peripheral wall.

The pot part 8 is made as a pressing of of a metal plate and is mounted on the base 13, which has a slightly raised circular protrusion at its peripheral part. The base 13, the pot part 8 and the cutting plate 12 are assembled and fixed in one unit by caulking rivets 32. Since the peripheral part of the base 13 is slightly raised further than the other parts of the base 13, the near periphery part of the pot part 8 is raised by a little. Accordingly, the lower peripheral edge of the cutting plate 12 tightly contacts the inner face of the pot part 8, thereby assuring a water-tight contact of this part.

Figure 2:
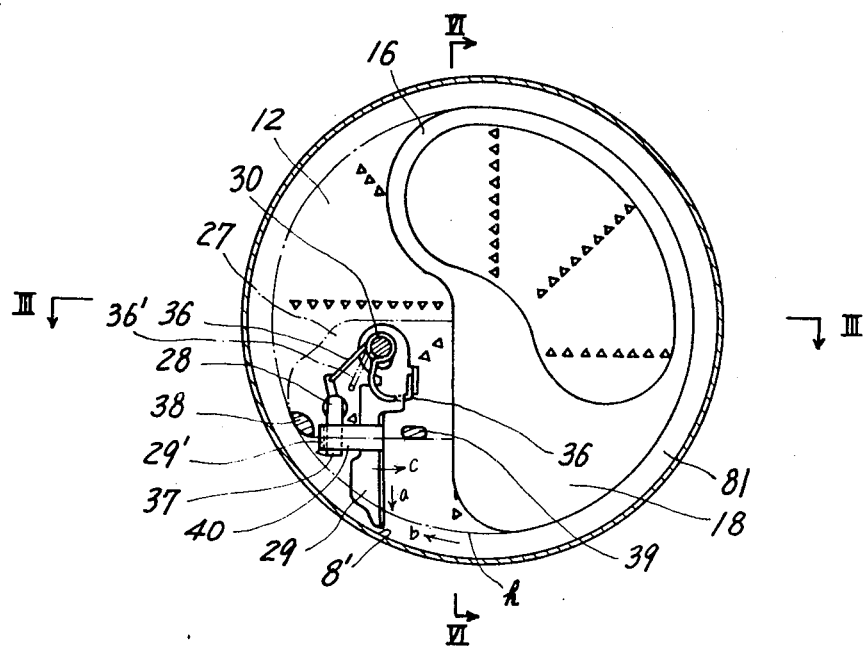
FIG. 2 is a plan view of the bottom part of a basket, an adjustable scraper, a food feeding duct and food pressing member.
Figure 5:
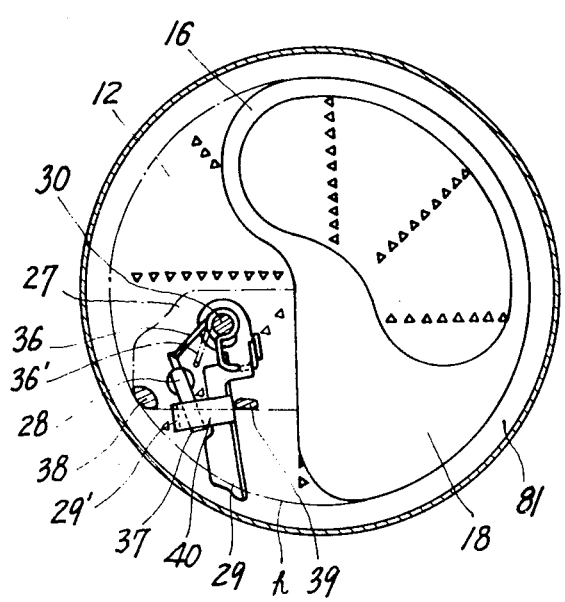
FIG. 5 is another plan view of the bottom part of the basket, an adjustable scraper, a food feeding duct and food pressing member, wherein the scraper is adjusted not to contact a peripheral wall of the bottom part of the basket.
Figure 6:
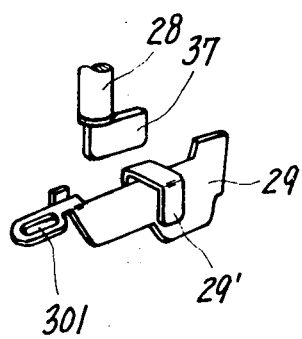
FIG. 6 is a fragmentary perspective view of the pin-in-slot connection of the scraper.

An upper case 14 is mounted on the body case 2, and an inverted bowl shaped cover 15 is placed on the upper case 14. A ring shaped shelf 20 is formed in the upper case 14 so as to be situated under the flange 91 in a manner to receive the pulp discharged out of the basket 9. The sump space 19 is for receiving the pulp discharged from the rotating basket 9. The top part of the cover 15 is shaped round and the curvature over the sump space 19 is made small (namely, has a larger radius of curvature than over the opposite side) so that the pulp can smoothly flow down into the sump space 19. The cover 15 has a food feeding duct 16, the lower edge of which is situated over the cutting plate 12 with a specified narrow grating gap A in between. A pressing member 18 is formed in one continuous body with the food feeding duct 16 in the down stream position of the food feeding duct 16 with respect to the rotation of the basket 9, as shown in FIG. 2 and FIG. 5. An open space is formed in the downstream position of the pressing member 18. The grating gap between the bottom of the pressing member 18, which is flush with the lower edge of the food feeding duct 16, and the upper tips of the cutting teeth is selected smaller than the height of the peripheral wall 8' of the pot part 8, and one example of the grating gap A is 1 mm or smaller; the circular peripheral gap B (FIG. 3) between the outer side faces of the feeding duct 16 and the pressing member 18 and the inner peripheral wall 8' of the pot part 8 is made larger than the gap A, so as to easily discharge the ground food therethrough.

The aforementioned circular shelf 20 separates a juice collecting space 181 from the pulp sump space 19. The juice collecting space 181 is connected to a faucet 20, under which a receiving cup 23 is placed. A detachable wall 21 is provided on the faucet 20, so that the inner side of the faucet 20 can be easily cleaned by removing the detachable wall 21. A pressing rod 22 is for pressing the food down in the feeding duct 16 and has a widened head 22' so that the lower tip of the rod 22 is situated with a specified gap of, for example 1.5 mm, over the cutting plate 12 when the rod 22 is pressed down to its lowest position.

A horizontal frame 27 is formed, in the open space, in one body with the food pressing member 18, and a linking rod 28 is rotatably supported by a hole on the cover 15 and a hole on the frame 27. A stopper washer 31 and an adjusting handle 33 are fixed on the rod 28, and a clicking spring 35 and clicking protrusion 34 to meet notches on the cover 15 are provided on the handle as a detent means providing multiple click-stops for the handle. A putter shaped adjustable stopper 37 is provided at the lower tip of the rod 27. A scraper 29 is slidably, as well as deflectably pivotted on the frame 27, with its elongated hole 301 by a pin 30. And a specially shaped spring 36 is provided so as to push the scraper 29 in the direction of arrow "a" and also to turn in the direction of arrow "c" thereby to keep the tip of the scraper 29 off the peripheral wall 8'. The face of the scraper 29 is not vertical but is tilted as shown in FIG. 3, in a manner that upper part of the adjustable scraper 29 is in a more upstream position than the lower part thereof with respect to the direction of the rotation of the basket 9. The pin 30 is situated in an eccentric position with respect to the axis of the basket 9. As shown in FIG. 4, the tip of the scraper 29 is situated at a position to scrape on the perforation 11 on the peripheral wall 8'.

An L-shaped engaging tab 29' is provided on the scraper 29 by bending an extended part 40 of the scraper plate. The frame 27 has two protrusions, an outer stopper 38 and an inner stopper 39, for limiting the motion of the engaging tab 29' and the scraper 29, respectively. By selecting the handle 33, the position of the adjustable stopper 37 is switched between a "scraping position" shown in FIG. 2 and a "resting position" shown in FIG. 5. In the "scraping position" of FIG. 2, the tab 29' is allowed to move between the adjustable stopper 37 and the outer stopper 38. In such scraping position, the tip of the scraper 29 is brought very close to the peripheral wall 8' with a very narrow gap inbetween by means of anti-clockwise spring action (arrow c) of the spring 36, so that, by being pushed by a lump of food, the tip of the scraper 29 touches the peripheral wall 8'. In the "resting position" of FIG. 5, the scraper 29 is allowed to move between the inner stopper 39 and the adjustable stopper 37. In such resting position, the tip of the scraper 29 becomes off the peripheral wall 8', but is kept slightly outside the hypothetical circle "h" by the scraper 29 abutting the stopper 39 by means of the anti-clockwise spring action (arrow c). In the resting position, even though a lump of food pushes the scraper 29, the scraper does not reach the position to contact the peripheral wall 8' because the adjustable stopper 37 prohibit the outward motion of the scraper 29.

OPERATION

By connecting the motor 1 to an electric supply, the motor 1 rotates at a high speed, for example 11,500 rpm, thereby rotating the rotatable table 6, hence transmitting the rotation through the base 13 to the basket 9.

Then, food such as fruit or vegetable is fed into the feeding duct 16, and is pushed down on the cutting plate 12. The food is ground by rotating teeth on the cutting plate 12 and the pressing member 18. The ground food, which is a mixture of juice and pulp, is released in the open space on the cutting plate 12 and then sent by centrifugal power to the peripheral wall 8' of the pot part 8. The ground food crashes on the peripheral wall and loses centrifugal force and motion. Then, successively sent ground food crashes also by the centrifugal force to the peripheral wall 8' of the pot part 8 and pushes the previously sent food out of the pot part 8 onto the filter 7, where the juice is filtered away by the centrifugal force into the juice collecting space 181 and sent to the receiving cup 23 through the faucet 20. The pulp is sent outward on the filter 7 by a component of the centrifugal force and discharged from the basket 9 into the sump space 19.

Very fine pulp particles of the ground food pass through the perforations 10 of the filter 7 and are mixed with the juice in the cup 23.

When the handle 33 is set and hence the adjustable stopper 37 is set at the "scraping position" as shown in FIG. 2, the tip of the scraper is shifted toward the peripheral wall 8', and hence, ground food rotating at a high speed on the cutting plate 12 pushes the tip part of the scraper 29 outward, thereby making the scraper 29 contact the peripheral wall 8'. The food on the peripheral wall 8' is scraped down onto the bottom of the basket 9 by the tilted face of the scraper 29 and again is sent to the peripheral wall 8' by the centrifugal force. Ground pulp particles are caught by the perforations 11 of the peripheral wall 8', namely tips of the pulp particles are inserted into the perforations 11 by the centrifugal force, and the part of the pulp particles remaining in the perforations 11 are cut by the scraper 29. Then, the pulp particles caught in the perforations is discharged outward from the perforations 11 by the centrifugal force. Successive cutting and discharging of the pulp is made until substantially all pulp particles are thus treated. Of course, excessively hard pulps are not caught by the perforations 11, and therefore are sent to the filter 7 and then discharged into the pulp sump space 19. Since the pulp particles pass through the perforations 11 are cut and ground into fine size when passing the perforations 11, the pulp gives a fresh and nourishing taste to the juice.

Since the outer stopper 38 prohibits the scraper 29 to excessively turn outward and the elongated hole 301 allows the scraper 29 to draw back, the end tip of the scraper 29 does not bite into the peripheral wall 8'. Therefore, undesirable squeaking of the peripheral wall 8' and scraper 29 are avoided.

When the handle 33 is turned to set the stopper 37 at the "resting position" shown in FIG. 5, the tip of the scraper 29 is kept away from the peripheral wall 8' by means of abutting by the adjustable stopper 37, and hence, even by being pushed by the ground food rotating at a high speed on the cutting plate 12 and on the peripheral wall 8', the scraper 29 does not contact the peripheral wall 8'. Therefore, the food on the peripheral wall 8' is not scraped down and successively sent toward the filter 7. Therefore pulp particles caught by the perforations 11 on the peripheral wall 8' is not cut by the scraper 29. Accordingly, fine size pulpy content of the juice is low, thereby making the juice purer.

The carrot is the vegetable having more pulp and less juice than other vegetables or fruits, and therefore, the ground carrot on the rotating peripheral wall 8' gives a stronger pushing force to the tip of the scraper than by other ground foods. If such more pulpy and less juicy food is ground with a spring adjusted to suit for grinding apples, the less juicy pulp will strongly push the tip end of the scraper 29. Therefore, the juice obtained in the cup 23 becomes too much pulpy. Accordingly, in order to obtain an ordinary juice with using carrot as material, it is preferable to increase the force of the spring 36 in order to obtain a moderate pressing of the tip end of the scraper to the pot wall. The increase of the spring 36 can be made by switching the supporting point of the spring 36 to the position of 36'. With such adjusting of the spring force, a juice with a desired concentration of the pulpy content part is obtainable for every kind of food.

Instead, when the "scraping" position of the adjustable stopper 37 is slightly shifted to the peripheral wall 8', the similar effect with increasing the force of the spring 36' is obtainable.

Since the scraper 29 is pivotted on the pin 30 with the elongated hole 301 and pushed by the pressing spring 36, when the end tip of the scraper is pushed by the ground food onto the peripheral wall 8' hence causing the end tip of the scraper 29 likely to be caught by the peripheral wall 8', the end tip is released of such catch by easily going back against the force of the spring 36 taking advantage of the play in the elongated hole 301 around the pin 30. If there is a small distortion on the peripheral wall 8' and catching of the end tip of the scraper 29 is likely to occur, such catching can also be evaded by the going back, and therefore, no undesirable violent force is applied to the stopper 38 nor the shaft 5 of the motor.

Since the face of the scraper 29 is tilted in a manner that the upper part thereof is in the upstream position than the lower part thereof with respect to the direction of the rotation of the basket 9, the ground food scraped by the scraper 29 is pushed toward the cutting plate 12, thereby preventing upward scattering of the food onto the inner face of the cover 15.

Since the perforations 11, 11,—on the peripheral wall 8' are disposed at the position higher than the bottom of the food feeding duct 16, the ground food does not directly shoot the perforations. Therefore, for the resting position (keeping off from the peripheral wall 8') of the scraper 29, the pulpy contents of the juice can be made small thereby making the juice clearer.

Since the position of the tip end of the scraper 29 is selected to be outside the hypothetical circle h drawn by extending the periphery of the food feeding duct 16 and the adjoining food pressing member 18, ground food existing in the ring shaped gap 81 between the peripheral wall 8' and the hypothetical circle h is swept by the scraper 29 to the space under the food feeding duct 16 and the food pressing member 18. Therefore, there is less possibility that the ground food such as seeds of fruit in the abovementioned ring shaped gap 81 scratches the outer walls of the food feeding duct 16 and the pressing member 18 and the peripheral wall 8'.

Since the stoppers 38 and 39, the adjustable stopper 37, the pin 30 and the spring 36 are disposed behind the scraper 29 with respect to the motion of the ground food, these stoppers are considerably protected from contamination by sticking of the ground food and hence, the function of the stoppers are well assured. When the pivotting part of the pin 30 and the elongated hole 301 are contaminated by the sticking of the ground food, the sticking can be released by swinging the handle 33 thereby moving the adjustable stopper 37 and hence the scraper 29.

As described in the detail in the foregoing, by selecting the position of the handle 33, the fine size pulp content of the juice can be adjusted. Therefore, either of clearer less pulpy juice or more pulpy and nourishing juice can be selectively obtainable.

What we claim is:

1. In a juice extractor, comprising:
   a centrifugal basket having as a filter an upwardly diverging frusto-conical peripheral wall having a plurality of juice-passing filtering perforations therethrough;
   an underlying pot part connected to the lower, smaller base of said frusto-conical peripheral wall, said pot part having a bottom wall with a generally flat upwardly facing inner face, and a generally vertically upstanding outer peripheral wall,
   means defining a plurality of cutting teeth on said pot part inner face;
   conduit means defining a food feeding duct situated substantially vertical to and overlying said bottom wall;
   motor means operatively connected to said basket for rotating said basket and said pot part at high speed about a generally vertical axis in a certain direction,
   the improvement comprising:

a plurality of pulp-passing perforations provided through said outer peripheral wall of said pot part, said pulp-passing perforations collectively being fewer in number but averaging larger in individual size than said juice-passing filtering perforations;

a scraper adjustably disposed within said pot part, said scraper having a forward face having an upper part, a lower part and a radially outer tip; and a selecting means connected with said scraper for adjusting the disposition of said scraper and said selecting means being movable between a first position and a second position, of which:

when said selecting means is in said first position said scraper forward face outer tip is disposed so close to said pot part outer peripheral wall as to be urgeable into scraping relation therewith upon said pulp-passing perforations when said scraper forward face is contacted by lumps of juice-bearing food pulp during high speed rotation of said basket and pot part, and when said selecting means is in said second position said scraper forward face outer tip is disposed more distally of and so far from said pot part outer peripheral wall as to not be urgeable into scraping relation therewith upon said pulp-passing perforations when said scraper forward face is contacted by lumps of juice-bearing food pulp during high speed rotation of said basket and pot part;

said forward face of said scraper, when said selecting means is in said first position, being of downward tilted disposition so that said upper part thereof is disposed further upstream than said lower part thereof will respect to said direction of rotation of said basket, so that at least some of the juice-bearing food pulp which has descended through said food feeding duct and which has been flung radially outwards by rotation upon said pot part upwardly facing inner face, to impact said pot part upstanding outer peripheral wall and is tending to move upwards along said pot part upstanding outer peripheral wall by succeeding quanta of said juice-bearing food pulp, is scraped off of said outer peripheral wall and downwards onto said pot part upwardly facing inner face, in effect being thereby recycled for further cutting and centrifugal impacting, and so that at least some of the juice-bearing pulp which has impacted said pot part upstanding outer peripheral wall and has protruded partially radially outwardly through said pulp-passing perforations, is sheared off by scraping engagement of said scraper front face outer tip with said pot part outer peripheral wall upon said pulp-passing perforations.

2. The juice extractor improvement of claim 1, further including:

housing means enclosing said centrifugal basket and pot part, said housing means including access cover means, and said housing means enclosing a space adjacent said centrifugal basket as a pulp sump space for receiving pulp overflowing from said basket; and said selecting means comprising a selector handle superimposed exteriorly upon said cover and a mechanical linkage operatively connecting said selector handle with said scraper.

3. The juice extractor improvement of claim 2, wherein:

said mechanical linkage includes a shaft and means connecting the shaft with the scraper; and said food feeding duct conduit means, exteriorly thereof, and said cover include bearing means journalling said shaft for rotation.

4. The juice extractor improvement of claim 2, further including:

detent means on said selecting means and said housing means, providing at least two click-stop position for said handle, respectively corresponding to said first position and said second position of said scraper.

5. The juice extractor improvement of claim 3, wherein:

said connecting means includes a crank link and pin-in-slot means connecting said crank link between said scraper and said shaft, so that said scraper, at least when said selecting means is in said first position is free to move to a degree limited by travel of said pin in said slot into and from actual scraping relation with said pot part outer peripheral wall.

6. The juice extractor improvement of claim 1, wherein:

the lowest of said juice-passing perforations lie disposed above the lower extent of said food feeding duct.

7. The juice extractor improvement of claim 5, further comprising:

spring means resiliently biasing said pin along said slot in a sense to tend to dispose the scraper out of scraping engagement with said pot part outer peripheral wall, so that ground food pushing against said scraper causes the spring means to become loaded and the scraper to deflect into said scraping engagement against the restoration force of the loaded spring; and stop means for limiting the distance said spring means will resiliently hold said scraper away from scraping relation with said pot part outer peripheral wall.

8. The juice extractor improvement of claim 7, further including:

means for adjusting the magnitude of restoration force provided by said spring means.

9. The juice extractor improvement of claim 7, further comprising:

second stop means for limiting the force of scraping engagement of said scraper with said pot part outer peripheral wall while ground food is pushing said scraper into said scraping engagement.

10. The juice extractor improvement of claim 9, further comprising:

a third stop means for limiting the distance said scraper may move away from said pot part outer peripheral wall when said selecting means is in said second position thereof.

11. The juice extractor of claim 5, wherein:

said pin-in-slot means further accommodates and provides for limited generally vertical motility of the scraper.

* * * * *